Patented Nov. 10, 1936

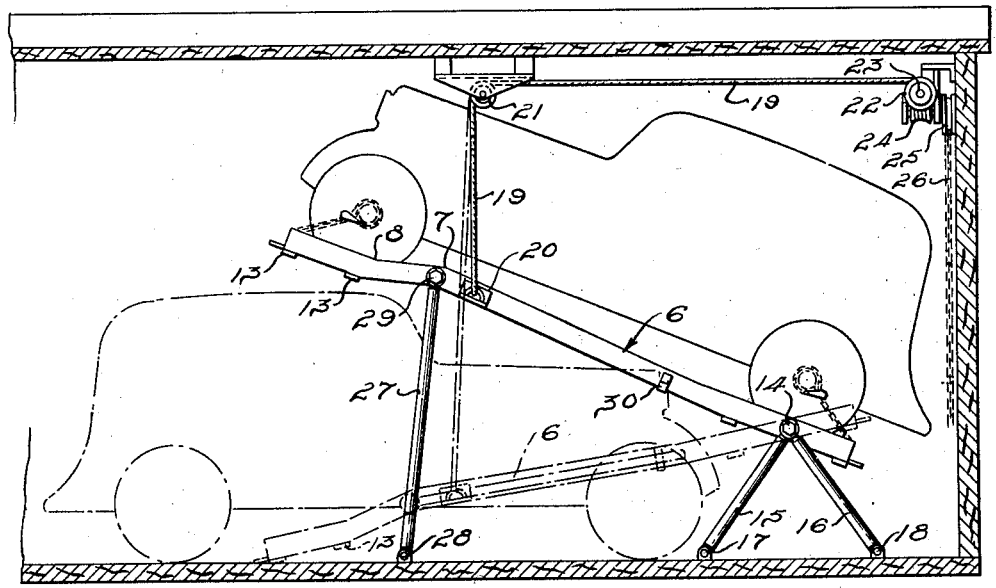
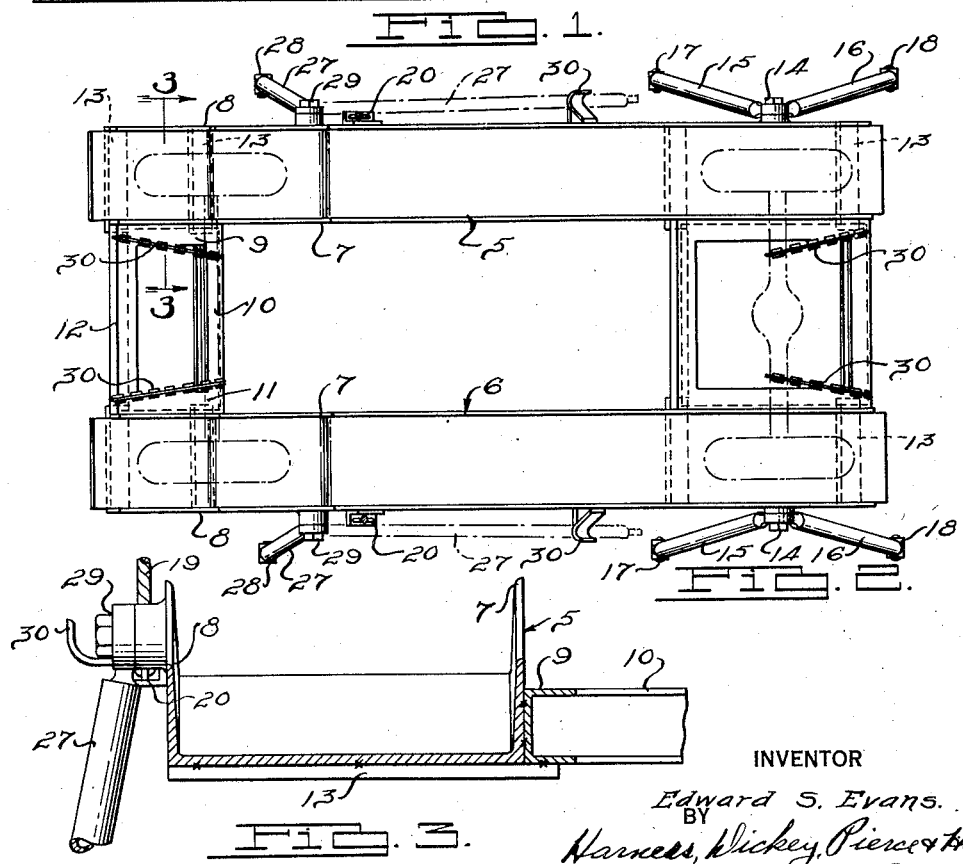

2,060,059

UNITED STATES PATENT OFFICE 2,060,059

CAR LOADING DEVICE

Edward S. Evans, Detroit, Mich., assignor to The Worth Company, a corporation of Michigan Application August 12, 1933, Serial No. 684,858

8 Claims. (Cl. 105—368)

This invention relates to car loading devices and in particular to a mechanism for disposing an automobile or other object in a semi-decked position, along with other automobiles or other objects, for transportation in a freight car, a truck, or the like.

One object of the invention is to provide a mechanism which will both raise an automobile, or other object, from a position on the floor of a freight car into a semi-decked position, that is, a position sufficiently above the floor to allow another automobile or other object to be placed beneath at least a part of the raised automobile, and retain the raised automobile in that elevated position and prevent it from being bumped or otherwise injuriously affected by the shocks resulting from the movement of the freight car.

Another object of the invention is to provide a semi-decking mechanism which will eliminate the necessity of removing any of the parts of the automobile in order to provide the necessary clearance, and which can be adapted to automobiles of different wheelbase, size, or make.

Another object of the invention is to provide a mechanism which offers more compact loading of automobiles in freight cars by reason of a more efficient use of the storage space in the end zones of the cars.

Another object of the invention is to provide a semi-decking mechanism which can be easily mounted on all freight cars and which when mounted can be operated with a minimum of manual labor.

Another object of the invention is to provide a semi-decking mechanism which will place a minimum of stress on the roof of the freight car.

The invention will be better understood by the following description with reference to the illustrative embodiment of the invention shown in the accompanying drawing which forms part of the specification.

Figure 1 is a fragmentary longitudinal vertical sectional view of a freight car illustrating an automobile loading mechanism constructed according to one form of the invention. The dotted outline shows the mechanism in its loading position ready to have an automobile backed up upon it. The full outline shows the mechanism together with an automobile attached thereto raised to a semi-decked position. The dotted outline of the automobile on the floor of the freight car illustrates how a second automobile may be placed partly under the already decked frame and automobile.

Fig. 2 is a plan view, on a scale somewhat larger than Fig. 1, showing the construction of the improved frame.

Fig. 3 is a sectional view on a larger scale of a portion of the frame along the line 3—3 of Fig. 2, looking in the direction of the arrows.

Referring to Fig. 2, a rectangular frame with a large open central portion is constructed by welding together standard sections of rolled steel. The side members 5 and 6 of the frame are formed from channel irons with the channel side up. The front ends of the channels 5 and 6 are each downwardly offset with respect to their main portion. In the construction shown each of the channels 5 and 6 is upwardly bent somewhat at a point 8 near its front end and again downwardly bent the same amount at a point 7 rearward of the aforementioned upward bend. The purpose of this downward offset will be subsequently explained.

The front ends of channels 5 and 6 are interconnected by a rectangular structure formed by welding together four short lengths of channel 9, 10, 11 and 12. As shown in greater detail in Fig. 3, the channel 9 in this connecting structure is welded to the outer surface of the inside flange of channel 5. This joint is reinforced by plates 13 which are welded to the undersides of the channels 5 and 9. Channel 11 of the rectangular structure is similarly joined to channel 6.

A similar rectangular structure in like manner extends between and rigidly connects the rear ends of channels 5 and 6. The outer sides of channels 5 and 6 are, near their respective rear ends, each supplied with a laterally extending pivot 14. To each pivot 14 are connected two rods 15 and 16 which extend downward forming an A brace. The lower ends of each of the rods 15 and 16 are rigidly fastened to the floor of the car at longitudinally spaced points 17 and 18, which are also spaced outwardly from the channel frames 5 and 6. In this manner the frame at its rear portion is supported and swingable about a transverse horizontal axis somewhat raised from the floor.

For raising and tilting the frame to its semi-decked position, cables 19 are provided at each side of the frame and such cables are connected to opposite sides of the frame at points 20. The cables in turn extend upwardly, are trained over pulleys 21 supported by the roof of the car, and then extend horizontally to points adjacent to the upper rear corners of the car where they are wound around rotary drums 22 mounted on a rotary shaft 23 transverse to the car.

The shaft 23 has a worm wheel (not shown)

which engages with a worm 24 and the worm shaft (not shown) is provided with a sprocket wheel 25 about which an endless chain 26 is trained. This chain extends down along the rear wall to a point convenient for manual operation. Thus by manipulating the chain, the frame may be raised from the loading position on the floor, and, owing to the gear reduction, it may be raised with an automobile thereon by manual manipulation without excessive effort.

Once the frame is raised to this position it is desirable that it be maintained there by means more rigid than the cables 19 and better able to withstand the shocks of transportation. For this reason an anchorage structure is provided to maintain the forward end of the frame in raised position. As shown in the drawing, this may take the form of a link structure comprising a third pair of rods 27 pivoted to opposite sides of the frame on laterally projecting pivots 29. A pair of clips 30 are provided one on each side of the rear part of the frame and positioned so that the rods 27, when not in use, may be swung up and engaged therein. When it is desired to fasten the frame rigidly in the semi-decked position, the frame is raised to this position by means of the cable 19 as described before. The rods 27 are then disengaged from their clips 30 and swung to the floor. The lower ends of the rods 27 are then suitably fastened to the floor at points 28 positioned on the floor of the car so that the rods 27 form approximately vertical supports. The cable, if desired, may then be loosened so that the full weight of the frame and automobile may be transmitted to the floor of the freight car by the rods 15, 16 and 27.

With the frame and automobile in the semi-decked position there is a considerable space below the frame, particulary the front portion. This space is large enough to allow another automobile to be rolled, radiator end first, until it is partly underneath the frame and the previously decked automobile. The radiator portions of the second automobile, which are usually narrow in comparison to the total width of the car, may project up between the channels of the frame and in front of the rectangular structure connecting the rear ends of the channels. The second automobile may be rolled toward the rear of the car until the windshield and top of the second automobile are below and extend rearward of the front wheels of the decked automobile due to the previously mentioned offset of the frame which in inclined position allows additional clearance rearward of the front wheels of the decked automobile.

The operation of the device is as follows. The frame is first placed in its loading position by allowing the front end of the frame to swing down lower than the rear end and rest upon the floor. An automobile is placed on the freight car with the rear wheels directly forward of the channels 5 and 6 where they rest on the floor. The automobile is then rolled backwards up the channels until all four wheels rest in the channels. In this position the automobile is secured to the frame by means of suitable fastenings such as chains 30 secured to opposite ends of the frame and adapted to be secured to opposite ends of each of the axles of the automobile. The frame together with the automobile secured thereto is swung to the semi-decked position by manipulating the chain 26 as described before. The rods 27 are disengaged from the brackets 30, swung down to the floor and fastened thereto at 28. The tension on the chain 19 is then released.

A second automobile is then rolled underneath the frame as far as safe clearance will permit and fastened to the floor in that position by chains or the like. With the two ends of a freight car equipped with a device such as this, it is possible to load one or two additional automobiles in the freight car due to more advantageous and compact loading at the ends of the car. To unload the automobiles the process is reversed.

It will be noted that when the anchorage rods 27 are secured to the floor and the tension on the cables 19 released, the floor of the freight car supports the frame and the decked automobile. The roof of the car is subjected to no load whatsoever. Inasmuch as the decked automobile is supported in this manner during transportation of the freight car, this feature of the invention is particularly valuable for it is during transportation or switching when the freight car is jolted and swayed that the frame, the supporting members, and whatever parts of the freight car these are connected to, are subjected to the greatest forces. With this device, the roof of the car need only be strong enough to raise the frame to the semi-decked position. Since this operation is carried on while the car is at a standstill, the roof of the car is subjected only to static forces, equal approximately to half the weight of the automobile and frame, and transmitted to the roof only during the short time required to complete the decking operation.

Formal changes may be made in the specific embodiment of the invention described without departing from the spirit and substance of the broad invention, the scope of which is commensurate with the appended claims.

I claim:

1. In combination with a freight car or the like, a frame initially positioned in inclined relation to the floor of said freight car, one end of said frame resting on said floor and the other end thereof being supported above the floor of the car by a pivotal connection to the floor of the car, said frame being swingable about said pivotal connection, means to secure an object to said frame while the frame is in said initial position, means to swing said frame about said pivotal connection to a secondary position upwardly displacing the free end of said frame, and means to retain the frame in said secondary position.

2. The combination with a freight car or the like, of a frame in the car and adapted to support the wheels of an automobile, means connected to the car and pivotally connected to the frame for holding one end of the latter elevated above the floor of the car, so that the frame is disposed in an inclined position with its other and free end lowermost, whereby the automible may be rolled up the inclined frame and into proper position thereon, means for holding the initially higher end of the automobile relative to the frame and tightened by the weight of the automobile, means for holding the other end of said automobile relative to the frame, means for raising the free end of the frame and disposing it in an oppositely inclined position with respect to its first position, and bracing rods on opposite sides of the frame for holding the latter in the second position mentioned while still permitting a second automobile to be rolled under the frame and between the rods.

3. In combination with a freight car having a floor, a car loading device comprising a frame for supporting all wheels of an automobile, means engaging said frame adjacent one end thereof for supporting same a predetermined distance above the floor, means pivotally engaging the frame adjacent the other end and between the points on the frame where the front and rear wheels of an automobile engage the frame for supporting the frame in an inclined position, said frame being downwardly offset beyond the point of said second support for accommodating the front of the decked automobile between the frame and the roof of the car.

4. In combination with a freight car, a car loading device comprising a frame for supporting all wheels of an automobile, means pivotally connecting said frame adjacent one end thereof for supporting same a spaced distance above the floor of the freight car, means engaging said frame at a point adjacent the other end thereof higher than an automobile loaded under the frame for supporting the frame in an inclined position, said point being located on said frame between the front and rear wheels of an automobile disposed on said frame, and said frame being downwardly offset terminally beyond said point for accommodating the front of the decked automobile between the offset portion and the roof of the car.

5. In combination with a freight car, a car loading device comprising a frame for supporting all wheels of an automobile, means pivotally engaging said frame adjacent one end thereof for supporting the said end a spaced distance above the floor of the freight car, means for raising the other end of the frame above the floor, and means engaging said frame at a point adjacent the other end thereof and higher than an automobile loaded under the frame whereby the frame is supported in a semi-decked position, said point being located on said frame between the front and rear wheels of an automobile loaded on said frame, and said frame being downwardly offset terminally beyond said point for accommodating the front of the loaded automobile between the frame and the roof of the car.

6. In combination with a freight car, a car loading device comprising a frame for supporting all wheels of an automobile, thrust means connecting one end of the frame to the floor of the car for supporting said end a spaced distance above said floor, means for raising the other end of the frame to a position above the first end, and means engaging said frame at a point intermediate the front and rear wheels of an automobile loaded thereon for supporting the frame in said inclined position, said point being higher above the floor than the heighth of an automobile loaded under said frame, and said frame being downwardly offset terminally beyond said point for accommodating the front of the loaded automobile between the frame and the roof of the car.

7. In combination with a freight car, a car loading device comprising a frame for supporting all wheels of an automobile, means pivotally engaging said frame adjacent one end thereof for supporting said end a spaced distance above the floor of the freight car, means for raising the other end of the frame above the floor, and means engaging said frame whereby the frame is supported in an inclined plane with the front of an automobile loaded thereon close to the roof of said freight car, said frame being offset intermediate its ends, and said offset being so constructed and arranged as to accommodate thereunder the top of a car loaded under said frame.

8. In combination with a freight car or the like, an automobile loading frame adapted to receive and support an automobile, means for pivotally supporting one end of the frame in elevated position comprising two pairs of struts, the struts of each pair being secured at their lower ends to the floor of the car adjacent one side of the frame and having eyes at their upper ends, said struts of each pair converging upwardly with their respective eyes in axial alignment, and the struts of the respective pairs being positioned on opposite sides of the frame, trunnions carried by the frame and journaled respectively in the aligned eyes of the struts of each pair, and means connected to the opposite end of the frame for elevating the same from a position on the floor to a position elevated above the axes of said strut eyes.

EDWARD S. EVANS.